C. H. CILISKE.
SELF HEATING FLAT IRON.
APPLICATION FILED AUG. 20, 1909.
983,683.
Patented Feb. 7, 1911.
2 SHEETS—SHEET 1.
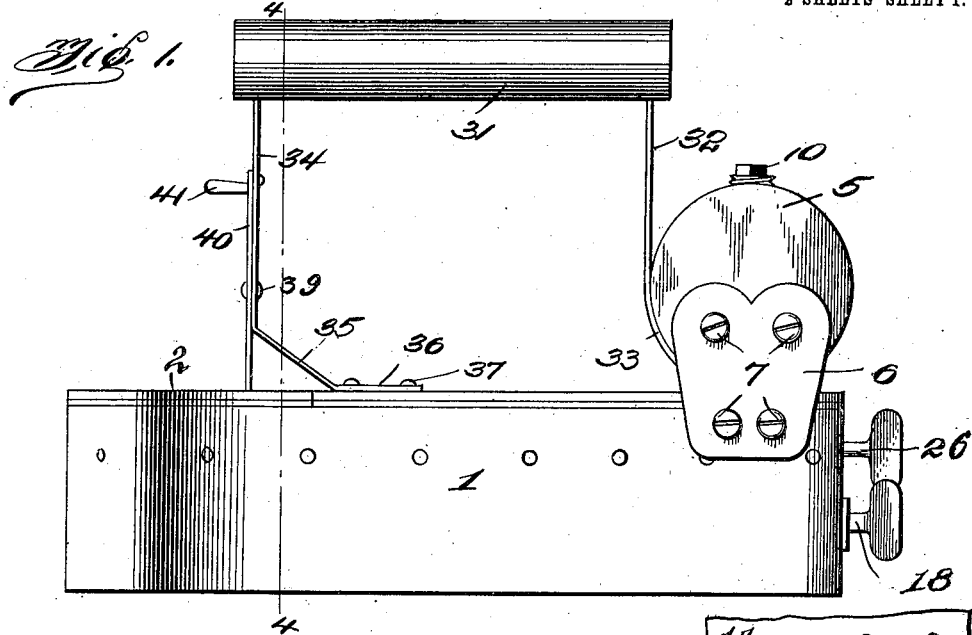
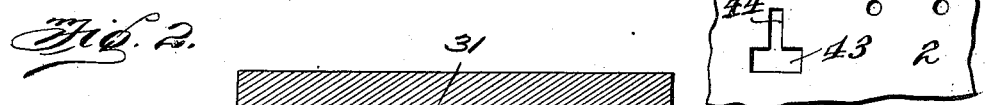
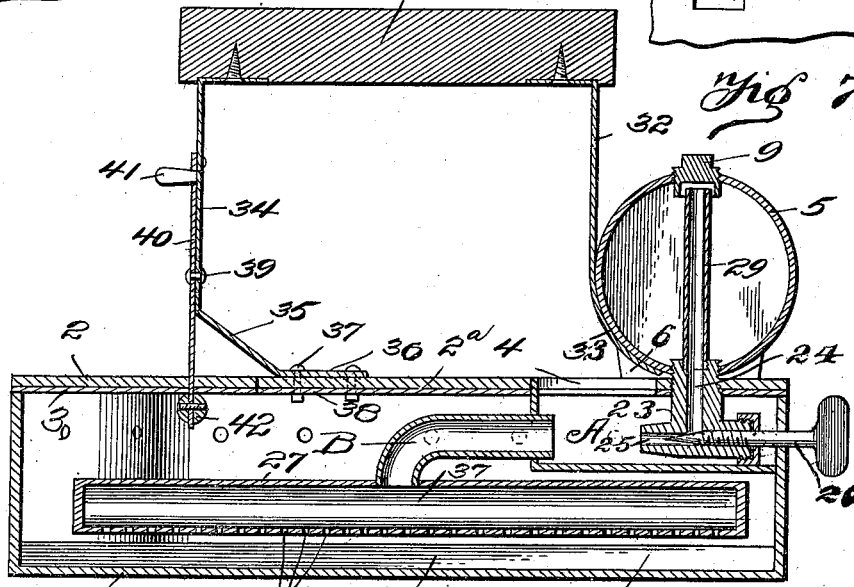
Inventor
Charles H. Ciliske
Witnesses
By Victor J. Evans
Attorney

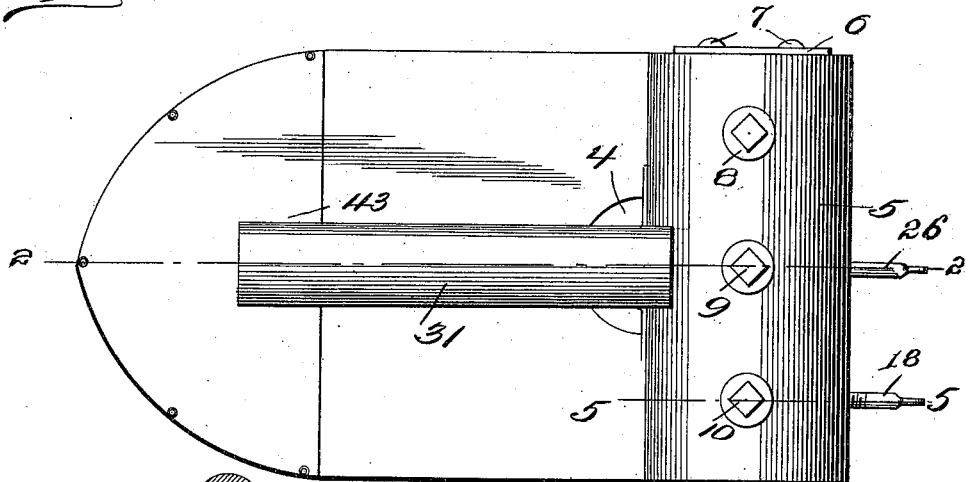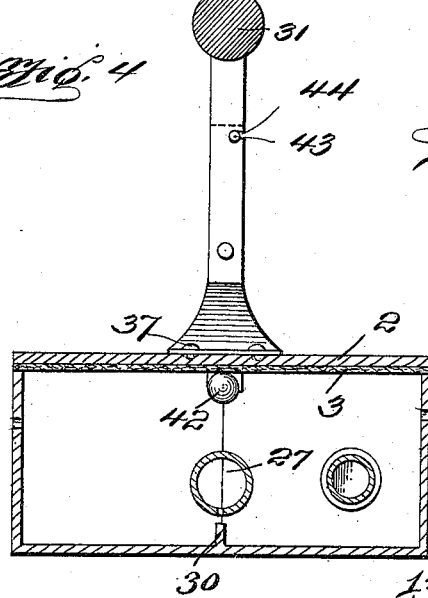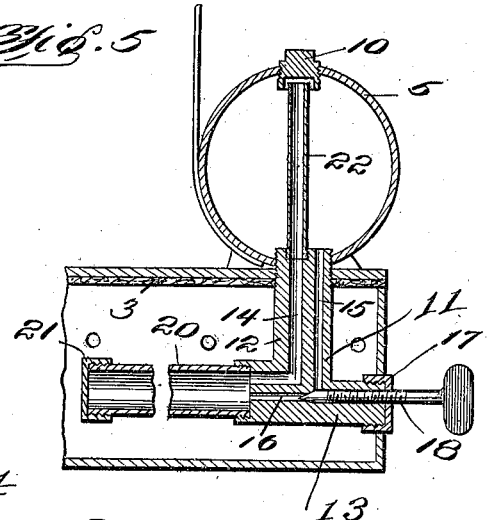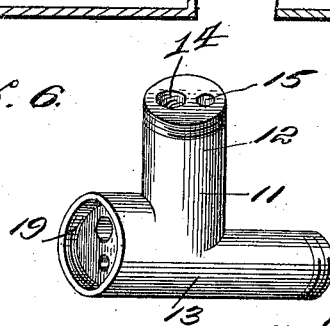

UNITED STATES PATENT OFFICE.

CHARLES H. CILISKE, OF CHICAGO, ILLINOIS.

SELF-HEATING FLAT-IRON.

983,683.

Specification of Letters Patent. Patented Feb. 7, 1911.

Application filed August 20, 1909. Serial No. 513,822.

*To all whom it may concern:*

Be it known that I, CHARLES H. CILISKE, a citizen of the United States, residing at Chicago, in the county of Cook and State of Illinois, have invented new and useful Improvements in Self-Heating Flat-Irons, of which the following is a specification.

This invention relates to self heating irons, and the object of the invention is to provide a device of this character wherein the heat may be readily regulated and which is so arranged and constructed as to provide an extremely simple, cheap and effective device of this character.

With the above, and other objects in view which will appear as the description progresses, the invention resides in the novel construction and arrangement of parts hereinafter fully described and claimed.

In the accompanying drawings there has been illustrated a simple and preferred embodiment of the invention, and in which, Figure 1 is a side elevation of an iron constructed in accordance with my invention.
Fig. 2 is a central longitudinal sectional view upon the line 2—2 Fig. 3. Fig. 3 is a top plan view of the device. Fig. 4 is a vertical sectional view upon the line 4—4 Fig. 1. Fig. 5 is a detail sectional view upon the line 5—5 Fig. 3. Fig. 6 is a detail perspective view of the vaporizer. Fig. 7 is a detail.

Referring to the drawings the numeral 1 designates the iron proper. The iron is of the ordinary hollow formation and is provided with a top portion 2 and a central removable plate $2^a$, and the members 2 and $2^a$ have their inner faces provided with non-heat conductive material as designated by the numeral 3. The removable plate $2^a$ is provided with an enlarged opening 4 adjacent its rear portion and which is adapted to serve as an entrance of fresh air to the interior of a mixing chamber, hereinafter to be described.

The numeral 5 designates the gasolene tank for the iron. The tank is preferably of a cross sectional circular formation and extends the entire width of the said iron being connected thereto through the medium of a pair of plates 6 having suitable securing elements 7. The tank 5 has its upper portion provided with a plurality of threaded openings, preferably three in number, and these openings are each adapted for the reception of suitable headed closures 8, 9 and 10. The closures 9 and 10 have their lower faces provided with annular cut-away portions or flanges, for a purpose presently to be described, while the opening for the closure 8 is adapted to serve as a means whereby the gasolene or oil is admitted to the said chamber 5.

The numeral 11 designates the vaporizing plug which comprises a substantially vertical member 12 and a right angular offset or horizontal member 13. The member 13 extends from both sides of the member 11 and has one of its faces enlarged and provided with suitable threads 19 whereby a vaporizing tube 20 projecting within the body of the iron is connected therewith. The tube 20 has its free end normally closed through the medium of a detachable cap 21, and the plug 11 is provided with an enlarged L-shaped groove 14 communicating with the tube 20 and a substantially T-shaped bore or groove 15 which has one of its branches 16 also communicating with the said tube 20 and its rear extending portion threaded and adapted for the reception of a needle valve 18. The extending portion of the vaporizer containing the needle valve 18 is provided with a suitable cap 17, which effectively retains the said member 11 in proper position upon the iron, and at the same time provides a stuffing box for the valve 18. The vertical bore of the L-shaped opening 14 has its upper extremity threaded and this threaded portion is adapted for the reception of a pipe 22 which has its extremity positioned within the recessed or cut-away portion of the plug 10. By reference to Fig. 5, it will be noted that the vertical member 12 of the member 11 is threaded and engages similar threads within the top of the iron as well as a threaded aperture provided by the tank 5.

The numeral 23 designates the vapor outlet plug, Fig. 2. The outlet plug is of a substantial L-shaped formation and is provided with a vertical bore 24 communicating with an offset or horizontal bore 25. The offset member portion of this member 23 is positioned within a mixing chamber A directly below the opening 4 of the top of the iron, and this mixing chamber has connected therewith a suitable pipe member B communicating with the burner tube 27. This burner tube is preferably constructed of a suitable pipe having its under face provided with a plurality of perforations or minute openings 28, so that the flame from the said tube will be directed toward the bottom of the iron. The plug 23 has its horizontal bore 25 provided with a suitable needle valve 26 and the substantially vertical member of this plug is threadedly connected with the tank 5. The vertical bore 24 of the said plug is provided with an upwardly projecting pipe member 29 which has its extremity positioned within the recess or flange provided by the plug 9.

By reference to Figs. 2 and 4 of the drawings it will be noted that the lower plate or bottom of the iron 1 is provided with an interior centrally arranged longitudinally extending rib or projection 30. This projection is adapted to divide the lower portion or base of the iron into two separate compartments, the object being to have one of these compartments within which the vaporizing tube 20 is positioned, serve as a receptacle for a small amount of oil or gasolene which, when ignited, generates the vapors within the said tube 20 in a manner now to be described. When the iron is to be heated a small amount of gasolene is allowed to flow through the opening 15 of the vaporizing plug 11 to the pipe 20. The oil or gasolene already within the iron is ignited and heats the pipe 20 so as to generate gas therein. This gas passes through the bore 14 and the pipe 22 within the tank 5, and passes through the pipe 29 and the bore 24 of the member 23 to the burner 27. The lighted oil within the iron ignites the vapor delivered to the openings 28 of the burner tube 27. It will be noted that the needle valve 18 effectively controls the amount of fluid delivered to the vaporizing tube 20 and that the flow of vapors may be easily and quickly regulated as desired. It will be further noted that by providing the plugs 9 and 10 with the recesses or pockets within which are positioned the pipe members 29 and 22, the gases will be free to flow from one pipe to the other, thus heating the gasolene within the tank to a certain extent and providing for the ready generation of the gas within the vaporizing tube.

The opening normally closed by the member 8 is adapted to serve as a means whereby the gasolene will be readily poured within the tank 5, and while I have illustrated only the opening 4 leading to the mixing chamber A, it is to be understood that a number of air inlet openings as well as heat outlet openings are to be provided upon the body of the iron if desired.

The numeral 31 designates the handle of the device. This handle has its rear end face provided with a vertically depending portion 32 terminating in an arcuate extension 33 which is adapted to engage the side and under face of the cylindrical tank 5. The opposite portion of the handle is also provided with a vertically depending portion 34 which has a rearwardly extending member 35 having an offset 36 which is rigidly connected with the top plate 2ª through the medium of retaining elements 37. Pivotally connected with the vertical member 34 of this portion of the handle, as at 39, is a rod 40. This rod 40 has its upper extremity provided with a suitable handle 41 and its lower extremity provided with a cylindrical bar 42.

The top portion 2 of the iron 1 is provided with an enlarged cut-away portion 43 communicating with a reduced slot 44. When it is desired to position the handle upon the iron the member 32 is first placed against the cylindrical tank 5, the member 40 is swung so that the offset cylindrical bar 42 is inserted within the opening 43, and the rod is then swung upon its pivot so as to force the said offset 42 tightly into engagement with the under face of the top plate 2 between the walls provided by the reduced slot 44. By this arrangement it will be noted that while I have provided effective means for securing the handle to the iron, the removal of the said handle also provides for the removal of the top plate 2ª, so that free access to the interior of the iron may be readily obtained.

Having thus described the invention, what is claimed as new is:—

1. In a sad iron, a tank upon the iron, said tank having a plurality of threaded openings, threaded closures for these openings, two of said closures having their under faces depressed, a vaporizing tube comprising a plug having an L-shaped opening and a T-shaped opening, a tube connected with the plug, a needle valve for the T-shaped opening of the plug, and a pipe extension for the L-shaped opening of the plug, and said pipe extension adapted to be positioned directly beneath the depressed portion of one of the plugs.

2. An iron provided with a hollow body and a partially opened top, a tank connected to the rear of the iron, said tank having its top provided with a plurality of threaded openings, threaded closures for these openings, two of said closures having their under faces depressed, a pipe member positioned directly beneath one of the closures, a T-shaped plug provided with a T-shaped opening connected with the pipe, a needle valve for the plug, a second pipe positioned directly beneath the depressed space of the second closure, a plug connected with this second pipe member, said plug being provided with an L-shaped groove and a T-shaped groove, a needle valve for the T- shaped groove, and a burner tube connected with the plug and communicating with both of the grooves.

3. A hollow iron having an opened top, a removable plate for the top, said plate being provided with an opening, a tank adjacent this opening and connected with the sides of the iron, the said tank being provided upon its upper face with a plurality of threaded apertures, closures for these apertures, two of said closures having their under faces recessed, a generating plug for the iron, said generating plug being provided with an L-shaped opening and a T-shaped opening, a needle valve for the T-shaped opening, a pipe connected with the L-shaped opening, said pipe extending through the tank and having its upper end positioned within the recessed under face of one of the closures, a tubular member having one of its ends closed connected with both the T-shaped and the L-shaped opening of the generating plug, a second plug having a T-shaped opening, a needle valve for this second plug, a pipe member connected with the opening of the second plug and having its extremity positioned within the recessed face of the second closure of the tank, a mixing chamber communicating with the second plug, a burner tube connected with the mixing chamber, the inner face of the iron being provided with a longitudinally extending rib below the burner tube, and a removable handle for the iron.

4. In a flat iron, a fluid tank, pipes within the tank, plug members provided with ports connected with the iron and with the tank, valves for the ports of the plugs, a generator tube connected with one of the plugs, a burner tube connected with the second plug, a removable handle for the iron, said handle comprising two arms, one of said arms being detachably connected with the iron proper and its opposite arm being constructed of resilient material and engaging the side of and under face of the fluid tank.

5. A flat iron, a fluid tank positioned above the iron, said tank being provided with a normally closed inlet, pipes connected to and extending within the tank, ported plugs within the iron and connected with the pipes, a generating pipe communicating with one of said ported plugs, this plug being provided with a second port communicating with the tank and the generating pipe, a valve controlling the second port, a valve controlling the port of a second plug, a mixing chamber communicating with the port of the second plug, a burner tube connected with the mixing chamber, and a removable handle for the iron.

In testimony whereof I affix my signature in presence of two witnesses.

CHARLES H. CILISKE.

Witnesses:
  Rocco Motto,
  Vito Rotunno.